(12) United States Patent
Talyansky et al.

(10) Patent No.: US 9,398,044 B2
(45) Date of Patent: Jul. 19, 2016

(54) METHOD AND APPARATUS FOR DETECTING ATTACK ON SERVER

(71) Applicant: Beijing Blue I.T. Technologies Co., Ltd., Beijing (CN)

(72) Inventors: Michael Talyansky, Sunnyvale, CA (US); Alexei Tumarkin, Los Altos Hills, CA (US)

(73) Assignee: BEIJING BLUE I.T. TECHNOLOGIES CO., LTD., Beijing (CN)

( * ) Notice: Subject to any disclaimer, the term of this patent is extended or adjusted under 35 U.S.C. 154(b) by 30 days.

(21) Appl. No.: 14/381,770

(22) PCT Filed: Jun. 5, 2013

(86) PCT No.: PCT/CN2013/076793
§ 371 (c)(1),
(2) Date: Aug. 28, 2014

(87) PCT Pub. No.: WO2014/194495
PCT Pub. Date: Dec. 11, 2014

(65) Prior Publication Data
US 2015/0237067 A1    Aug. 20, 2015

(51) Int. Cl.
*H04L 29/06*      (2006.01)
*H04L 29/08*      (2006.01)
(52) U.S. Cl.
CPC ............ *H04L 63/1458* (2013.01); *H04L 67/02* (2013.01)
(58) Field of Classification Search
USPC ........................................................ 726/23
See application file for complete search history.

(56) References Cited

U.S. PATENT DOCUMENTS

2006/0010389 A1    1/2006   Rooney et al.
2007/0118344 A1*   5/2007   Bolt .................... G05B 23/0254
                                                              703/2
(Continued)

FOREIGN PATENT DOCUMENTS

CN    1996888      7/2007
CN    101345664    1/2009
CN    101917445    12/2010

OTHER PUBLICATIONS

NIST, Engineering Statistics Handbook, 2000, 6.4 Introduction to Time Series Analysis, http://www.itl.nist.gov/div898/handbook/pmc/section4/pmc4.htm.*

*Primary Examiner* — Andrew Nalven
*Assistant Examiner* — Khang Do
(74) *Attorney, Agent, or Firm* — Harness, Dickey & Pierce, P.L.C.

(57) ABSTRACT

The present invention discloses a method and apparatus for detecting an attack on a server. The method comprises: calculating interval time after a current request is received by the server, wherein the interval time is interval time between a time when a previous request is received and a time when the current request is received, or interval time between a time when a previous request, of a same type as a type of the current request, is received and the time when the current request is received, or interval time between a time when a previous response to the previous request, of the same type as the type of the current request is sent by the server and a time when a response to the current request is sent by the server; calculating a baseline moving average of interval time and a trigger moving average of interval time according to the calculated interval time, wherein the baseline moving average reflects a change of interval time in a long history period, and the trigger moving average reflects a change of interval time in a recent period; and when a ratio of the baseline moving average to the trigger moving average is larger than a first threshold, determining there is an attack on the server.

18 Claims, 4 Drawing Sheets

(56) References Cited

U.S. PATENT DOCUMENTS

| | | | |
|---|---|---|---|
| 2009/0043724 A1* | 2/2009 | Chesla | H04L 65/1079 706/52 |
| 2010/0281539 A1* | 11/2010 | Burns | H04L 63/1441 726/23 |
| 2011/0093422 A1* | 4/2011 | Chan | G06F 11/0727 706/46 |

* cited by examiner

will be included here.

METHOD AND APPARATUS FOR DETECTING ATTACK ON SERVER

FIELD

The present invention relates to the field of communications and particularly to a method and apparatus for detecting an attack on a server.

BACKGROUND

Distributed Denial of Service (DDoS) attacks are a major source of concern for Web properties. DDoS usually refers to an attempt to prevent or hinder access to a server by its regular users by sending an excessive number of requests to exhaust the server's resources such as bandwidth and/or processing power. A DDoS attack resulting in painfully slow responses to clients or even refusing their accesses, may be exploited by extortionists trying to get paid for not interrupting services, business competitors expecting to gain an edge in the market or political enemies trying to stir chaos.

It is rather difficult to estimate the financial implications of ongoing DDoS activities. An indirect indication is the amount of money corporations are willing to spend on DDoS prevention measures. According to findings of one of the most well-known analyst firm: (see http://www.infonetics.com/pr/2012/1H12-DDoS-Prevention-Appliances-Market-Highlights.asp)

1. Global DDoS prevention appliance revenue is expected to reach $272 million in 2012, up 29% from 2011.
2. The overall DDoS prevention appliance market is forecast to top $485 million in 2016.

Since more and more efficient DDoS defense mechanisms and tools are proposed and installed on routers and firewalls, the traditional network layer DDoS attacks (such as SYN flooding, ping of death and Smurf) are much easier to be detected and defended against. Increasingly, they are giving way to sophisticated application layer attacks.

Application layer DDoS attack is a DDoS attack that sends out requests following the communication protocol and thus these requests are indistinguishable from legitimate requests in the network layer. An application layer DDoS attack may be of one or a combination of the following types: (1) session flooding attack sends session connection requests at a rate higher than legitimate users; (2) request flooding attack sends sessions that contain more requests than normal sessions; and (3) asymmetric attack sends sessions with more high-workload requests (see Jie Yu, Chengfang Fang, Liming Lu, Zhoujun Li: *A Lightweight Mechanism to Mitigate Application Layer DDoS Attacks*. Infoscale 2009: 175-191.)

An efficient defense mechanism tries to minimize the fraction of the rejection of requests from legitimate users over the total number of requests from legitimate users (called the False Rejection Rate or FRR). Similarly, a False Acceptance Rate (FAR) should be as small as possible. Although a DDoS defense mechanism should reduce both FRR and FAR, reducing FRR is more important for the business and public relations reasons. That is, a server would rather maximally accommodate the legitimate user sessions, even if a small number of attacker sessions is allowed through.

Furthermore, the defense mechanism must be lightweight, to prevent itself from being the target of DDoS attacks. It is also preferred that the defense mechanism is independent of the details of the services, as then it can be deployed at any server without modification as discussed in the paper by Fang et al. cited above.

SUMMARY

Embodiments of the invention provide a method for detecting an attack on a server in a simple and efficient way.

Correspondingly, embodiments of the invention provide an apparatus and a computer program product for detecting an attack on a server.

A method for detecting an attack on a server includes:

calculating interval time after a current request is received by the server, wherein the interval time is interval time between a time when a previous request is received by the server and a time when the current request is received by the server, or interval time between a time when a previous request, of a same type as a type of the current request, is received by the server and the time when the current request is received by the server, or interval time between a time when a previous response to the previous request, of the same type as the type of the current request, is sent by the server and a time when a response to the current request is sent by the server;

calculating a baseline moving average of interval time and a trigger moving average of interval time according to the calculated interval time, wherein the baseline moving average of interval time reflects a change of interval time in a long history period, and the trigger moving average of interval time reflects a change of interval time in a recent period; and when a ratio of the baseline moving average to the trigger moving average is larger than a first threshold, determining there is an attack on the server.

An apparatus for detecting an attack on a server includes:

an interval time calculating module configured to calculate interval time after a current request is received by the server, wherein the interval time is interval time between a time when a previous request is received by the server and a time when the current request is received by the server, or interval time between a time when a previous request, of a same type as a type of the current request, is received by the server and the time when the current request is received by the server, or interval time between a time when a previous response to the previous request, of the same type as the type of the current request, is sent by the server and a time when a response to the current request is sent by the server;

a moving average calculating module configured to calculate a baseline moving average of interval time and a trigger moving average of interval time according to the interval time calculated by the interval time calculating module, wherein the baseline moving average of interval time reflects a change of interval time in a long history period, and the trigger moving average of interval time reflects a change of interval time in a recent period; and a determining module configured to determine there is an attack on the server when a ratio of the baseline moving average to the trigger moving average is larger than a first threshold.

A computer program product includes code means for performing steps of the above characterized method for detecting an attack on a server when run on a computer controlled device.

In the scheme for detecting an attack on a server, after a current request is received by the server, interval time is calculated, wherein the interval time may be interval time between a time when a previous request is received by the server and a time when the current request is received by the server, or interval time between a time when a previous request, of a same type as a type of the current request, is received by the server and the time when the current request is received by the server, or interval time between a time when a previous response to the previous request, of the same type as the type of the current request, is sent by the server and a time when a response to the current request is sent by the server; and then a baseline moving average of interval time and a trigger moving average of interval time are calculated according to the calculated interval time, wherein the baseline moving average of interval time reflects a change of interval time in a long history period, and the trigger moving average of interval time reflects a change of interval time in a recent period; and when a ratio of the baseline moving average to the trigger moving average is larger than a first threshold, it is determined that there is an attack on the server. Thus an attack on a server can be detected in a simple and efficient way. With the scheme for detecting an attack on a server, an unwanted activity aimed at the server can be detected simply and efficiently, and further the unwanted activity aimed at the server can be mitigated so that the resource utilization and available bandwidth of the server can be saved.

DETAILED DESCRIPTION OF THE EMBODIMENTS

A scheme for detecting an attack on a server in an embodiment of the invention includes: calculating interval time after a current request is received by the server, wherein the interval time is interval time between a time when a previous request is received by the server and a time when the current request is received by the server, or interval time between a time when a previous request, of a same type as a type of the current request, is received by the server and the time when the current request is received by the server, or interval time between a time when a previous response to the previous request, of the same type as the type of the current request, is sent by the server and a time when a response to the current request is sent by the server; calculating a baseline moving average of interval time and a trigger moving average of interval time according to the calculated interval time, wherein the baseline moving average of interval time reflects a change of interval time in a long history period, and the trigger moving average of interval time reflects a change of interval time in a recent period; and when a ratio of the baseline moving average to the trigger moving average is larger than a first threshold, determining there is an attack on the server.

The invention is applicable to a content delivery network, but is not limited thereto, and for example, the invention is also applicable to an authoritative DNS server, a Web hosting system, Web site operators, etc. Embodiments of the invention will be detailed below in a content delivery network as an example.

Embodiments of the invention are detailed below by referring to the Drawings.

Figure 1:
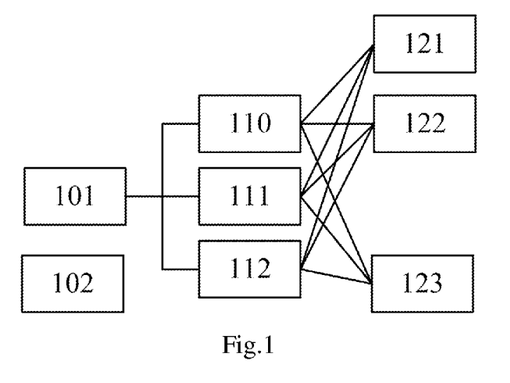
FIG. 1 is a schematic diagram of a DDoS attack on a server.

In a content delivery system, such as the one depicted in FIG. 1, a multitude of attackers 101-102 are trying to overwhelm content on all or some content delivery network elements (such as DNS servers or Web proxies) 121-123. Some (or all) of the attackers are impersonating multiple clients, such as the attacker 101 which can, for example, spoof IP addresses of clients 110-112. In the case of a DNS attack, it can be launched by issuing standard DNS requests (either for legitimate domains or even non-existent ones), or non-standard/broken DNS requests, etc. For an attack against Web servers/caches/proxies, attackers can issue different types of HTTP requests for existent resources or non-existent ones, broken HTTP requests, etc.

An efficient system for detecting and mitigating such attacks can be deployed at various layers of the network stack (and, optimally, it would tie together all of them), but for the sake of simplicity we will discuss only application-level implementations. For example, a successful DNS attack detection algorithm needs to examine the DNS protocol requests, to extract the domain, request type and so on. It also needs to maintain computed heuristic values per top-level domain and per white list entry, compute hash functions, perform lookup in hash tables. This processing goes beyond the traditional low-touch packet inspections, conventionally performed by kernel-space firewalls. Moreover, a large portion of this work needs to be done by the DNS server anyway, to serve a legitimate request, so if such checks are performed in the kernel, they will need to be done a second time in the application, thus adversely affecting performance of the normal operation. The premise of this design is that computational cost of such checks is comparable with the cost of waking up a user process and reading a UDP packet into application space (~50-100 microseconds, needs to be formally profiled), so performing this operation in user space (and not doing it in the kernel) will not result in performance degradation.

Other obvious benefits of doing application-level anti-DDOS protection in the user space include (but are not limited to):

Safer programming environment;

Much easier to debug, deploy and maintain;

Availability of application-specific functionality (parsing DNS records etc.); and Availability of much wider variety of programming tools (e.g. C++ STL)

Figure 2:
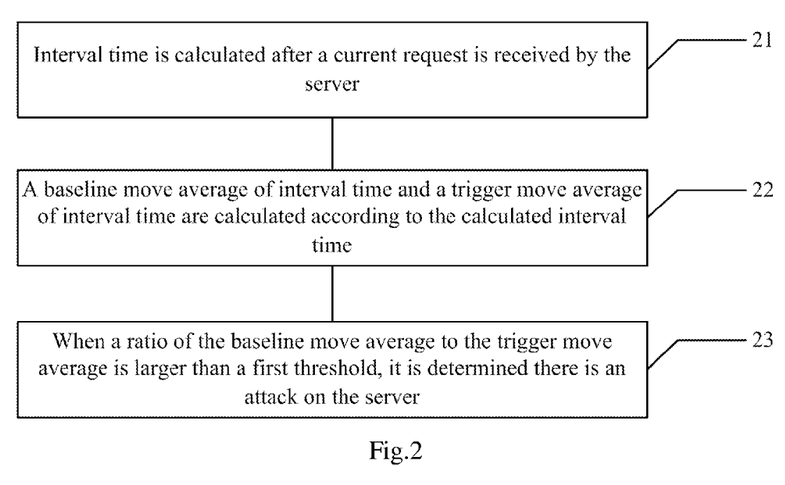
FIG. 2 is a flow chart of a method for detecting an attack on a server according to an embodiment of the invention.

FIG. 2 is a flow chart of a method for detecting an attack on a server according to an embodiment of the invention, which includes the following steps 21 to 23.

Step 21, interval time is calculated after a current request is received by the server.

Particularly, the interval time may be any one of:

interval time between a time when a previous request is received by the server and a time when the current request is received by the server;

interval time between a time when a previous request, of a same type as a type of the current request, is received by the server and the time when the current request is received by the server, and interval time between a time when a previous response to the previous request, of the same type as the type of the current request, is sent by the server and a time when a response to the current request is sent by the server.

That is, the invention is able to detect attacks on a very granular level, e.g., per request type.

Further, the interval time may be calculated each time when one current request is received by the server, that is the calculation is performed at every request. Alternatively, the interval time may be calculated each time when a preset number (the preset number is larger than one) of current requests are received by the server, for example, the calculation is performed at every three requests.

Even when the interval time is calculated each time when request is received, the method for detecting an attack on a server is very lightweight, and only little resources are required. When the interval time is calculated every preset number of requests (the preset number is larger than 1), calculation cost may be reduced even more.

Step 22, a baseline moving average of interval time and a trigger moving average of interval time are calculated according to the calculated interval time.

Particularly, the baseline moving average of interval time reflects a change of interval time in a long history period, and the trigger moving average of interval time reflects a change of interval time in a recent period.

Preferably, the baseline moving average of interval time is a cumulative moving average of interval time.

Preferably, the trigger moving average of interval time is an exponential weighted moving average of interval time.

Preferably, different functional forms of the baseline moving average are adopted for different servers.

Preferably, different functional forms of the trigger moving average are adopted for different servers.

Different servers (e.g., root server, enterprise server, etc) experience different attacks on a regular basis, thus it is preferable to adopt different functional forms of the baseline moving average and/or the trigger moving averages for different servers.

Step 23, when a ratio of the baseline moving average to the trigger moving average is larger than a first threshold, it is determined there is an attack on the server.

Alternatively, when a ratio of the baseline moving average to the trigger moving average is not larger than the first threshold, it is determined that there is no attack on the server.

When there is an attack on the server, an increased frequency of incoming requests in a recent period will present, and due to an increased frequency of incoming requests in the recent period, a ratio of the baseline moving average to the trigger moving average will increase to be larger than a preset first threshold.

Preferably, when it is determined that there is an attack on the server, the baseline moving average will not be recalculated so that the baseline moving average reflects a change of interval time in a long history period when there is no attack on the server, but the trigger average will be recalculated to indicate that either the attack is still continuing, or the attack has finished.

Further, when a ratio of the baseline moving average to a recalculated trigger moving average is smaller than a second threshold, it is determined that there is no attack on the server.

The first threshold and the second threshold may be set in advance, the first threshold is higher than the second threshold, and the second threshold is usually greater than 1. For example, the first threshold is 5 and the second threshold is 2.

Preferably, any one or more of a value of the first threshold, a value of the second threshold, a functional form of the baseline moving average, and a functional form of the trigger moving average is/are optimized according to previous observations including interval time calculated previously to minimize FRR and/or FAR.

Figure 3:
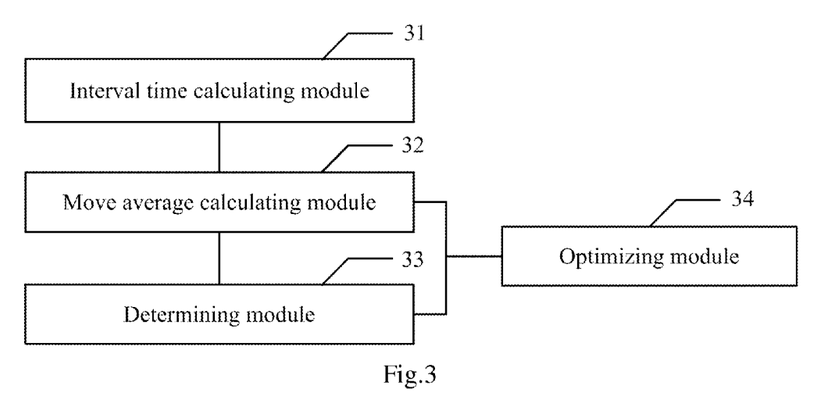
FIG. 3 is a schematic diagram of an apparatus for detecting an attack on a server according to an embodiment of the invention.

FIG. 3 is a schematic diagram of an apparatus for detecting an attack on a server according to an embodiment of the invention.

The apparatus includes an interval time calculating module 31, a moving average calculating module 32 and a determining module 33.

The interval time calculating module 31 is configured to calculate interval time after a current request is received by the server.

Particularly, the interval time may be any one of:
interval time between a time when a previous request is received by the server and a time when the current request is received by the server;
interval time between a time when a previous request, of a same type as a type of the current request, is received by the server and the time when the current request is received by the server, and
interval time between a time when a previous response to the previous request, of the same type as the type of the current request, is sent by the server and a time when a response to the current request is sent by the server.

The moving average calculating module 32 is configured to calculate a baseline moving average of interval time and a trigger moving average of interval time according to the interval time calculated by the interval time calculating module 31.

Particularly, the baseline moving average of interval time reflects a change of interval time in a long history period, and the trigger moving average of interval time reflects a change of interval time in a recent period.

The determining module 33 is configured to determine there is an attack on the server when a ratio of the baseline moving average to the trigger moving average is larger than a first threshold.

The determining module 33 is further configured to determine there is no attack on the server when a ratio of the baseline moving average to the trigger moving average is not larger than a first threshold.

The moving average calculating module 32 is further configured not to recalculate the baseline moving average and to recalculate the trigger moving average when the determining module 33 determines there is an attack on the server.

The determining module 33 is further configured to determine there is no attack on the server when a ratio of the baseline moving average to a recalculated trigger moving average is smaller than a second threshold.

Preferably, the baseline moving average of interval time is a cumulative moving average of interval time.

Preferably, the trigger moving average of interval time is an exponential weighted moving average of interval time.

Preferably, the apparatus further includes an optimizing module 34.

The optimizing module 34 is configured to optimize one or more of a functional form of the baseline moving average, a functional form of the trigger moving average, a value of the first threshold, and a value of the second threshold according to previous observations including interval time calculated previously to minimize FRR and/or FAR.

Preferably, different functional forms of the baseline moving average are adopted for different servers.

Preferably, different functional forms of the trigger moving average are adopted for different servers.

The apparatus may be an entity in a kernel space such as a kernel-space firewall or an entity in a user space such as the server itself or another server for aggregating and processing information about requests collected from the server.

A specific example of a method for detecting an attack on a server will be detailed below.

In this example, taking interval time calculated at every request as an example, and taking an attack to be a DDoS attack in the application layer as an example.

In this example, the attack detection scheme (i.e., the method for detecting an attack on a server) is based on using two specially designed recursive moving averages for inter-arrival times (i.e., interval time) and comparing their values at each request. Recursive move averaging has a significant advantage from the standpoint of the most efficient use of computational resources such as memory and CPU.

The most common examples of recursive moving averages are Exponential Weighted Moving Average (EWMA) and Cumulative Moving Average (CMA) (see http://en.wikipedia.org/wiki/Moving_average).

For an n-th observation, EWMA calculation looks as follows:

$$EWMA(n)=(1.0-\alpha)*EWMA(n-1)+\alpha*\delta$$

For an n-th observation, CMA calculation looks as follows:

$$CMA(n)=(1.0-(1.0/n))*CMA(n-1)+\delta/n$$

Here $\alpha$ is a model-dependent parameter, and $\delta$ is a time differential between the current and the previous recorded event.

EWMA is more sensitive to current load changes, and CMA maintains a more stable load average.

In general, the present invention uses two generalized recursive moving averages: Trigger Average (TA) and Baseline Long-Term Average (BLTA):

$$TA(n)=(1.0-F(n))*TA(n-1)+F(n)*\delta(n)$$

$$BLTA(n)=(1.0-G(n))*BLTA(n-1)+G(n)*\delta(n)$$

In particular, TA can be EWMA with the function F(n) being a constant $\alpha$, and BLTA can be CMA with G(n)=1/n. In general, F(n) and G(n) should be optimized according to the properties of inter-arrival times (during normal activity and during the previously observed attacks) to minimize FRR and/or FAR. One possibility is to represent F(n) and G(n) in a parameterized functional form (such as a ratio of polynomials with unknown coefficients), and then solve a non-linear minimization problem to find the optimal set of these parameters based on previous observations.

The scheme uses two thresholds: alert_trigger (i.e., the first threshold) and alert_off (i.e., the second threshold). The attack is declared to start when the TA becomes much smaller than BLTA (i.e., BLTA/TA is greater than alert_trigger). The alert is called off when BLTA becomes less than alert_off times TA. Usually, alert_trigger is much higher than alert_off, although alert_off is usually greater than 1. For example, alert_trigger=5 while alert_off=2. Alert thresholds should be optimized too. For example, let us assume that the goal is to minimize FRR. Functional forms of F(n) and G(n) can be chosen as first-degree rational functions with unknown coefficients:

$$F(n)=(a[1]+a[2]*n)/(1+a[3]*n)$$

$$G(n)=(a[4]+a[5]*n)/(a[6]+n)$$

The alert thresholds are considered as two additional parameters a[7] and a[8], where a[7] is an unknown alert_trigger and a[8] is an unknown alert_off. The problem of minimizing FRR becomes a non-linear optimization problem with 8 parameters a[1]-a[8] that can be solved by various algorithms such as simulated annealing. This procedure can be repeated periodically as more data become available, and more attacks have been experienced.

An attack detection procedure of an example of the invention is as follows.

Figure 4:
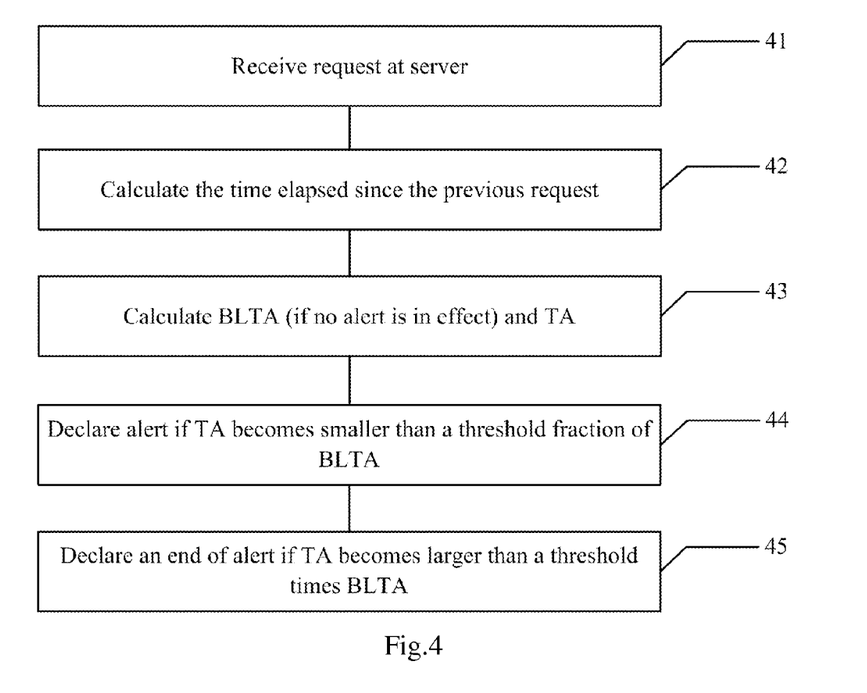
FIG. 4 is an attack detection procedure according to an embodiment of the invention.

In a preferred embodiment of the invention for a DNS system, the first level of detection is performed globally for all requests reaching the server (see FIG. 4). For each new request reaching the server (41), it will estimate the time elapsed since the previous request (42), and then it will calculate two moving averages, i.e., the baseline long-term average and the trigger average (43). Particularly, the baseline long-term average is only calculated when no alert is in effect. If the trigger average becomes much smaller than the baseline long-term average, then the load on the system becomes much higher (due to an increased frequency of the incoming requests) and it is determined that there is an attack on the server. Preferably, an alert may be declared when it is determined that there is an attack (44).

The alert is triggered when the ratio between these two moving averages exceeds a certain threshold (say, 5). This threshold can be adjusted during the course of operating the system based on new observed patterns of a "normal" behavior and on new detected attacks. After the alert has been triggered, the baseline long-term average will not be updated till the end of the alert period in order to preserve the information about the "normal" loads. The alert is turned off when the ratio of two moving averages becomes reasonably close to a certain threshold (e.g. to an ideal normal value of 1). Such threshold value can be adjusted during the operation of the system as well.

If the trigger average becomes larger than a threshold times the baseline long-term average, then it is determined that there is no attack on the server. Preferably, an end of alert may be declared when it is determined that there is no attack (45).

Similarly, the proposed system can estimate the current "load" for each type of request, for each top-level domain (say, site.com), etc. Thus the invention is able to detect attacks on a very granular level (per request type, per domain, per requestor or requestor IP block, etc.).

The system is also able to detect attacks against sub-domains of top-level domains (such as www.site.com). If an abnormal activity is detected for any of the existing hosts/sub-domains, the system will start checking the sources of the requests and will try to isolate the attacking local resolver.

After an attack is detected, corresponding mitigation measures may be adopted.

The following is a list of possible mitigation measures which can be used by the invention separately, altogether or in any combination of those for a DNS server:

1. If a global activity alert is raised (possible random domain attack), then it stops responding to non-essential requests and drops referral or NXDOMAIN responses. It also stops responding to requests for domains that are not in the white list of known top-level domains.

2. If an activity alert is raised on one of the top-level domains (possible random sub-domain attack), the system freezes the sub-domain white list for this top-level domain, and stops responding to requests to sub-domains not present in a white list. It also increases Time to Live (TTL) in the legitimate replies for sub-domains of this top-level domain and starts monitoring the consecutive requests from the same local resolver for the same domain. If the local resolver sends similar requests faster than the time allowed by the TTL, then this local resolver is declared to be an attacker (and all requests from this resolver are ignored).

3. If an activity alert is raised on a white list element of the sub-domain white list (white list attack), the system starts monitoring activity per local resolver's IP address and IP blocks, trying to detect clients that have increased their activity and/or do not honor the increased TTL set by the previous level. It then drops requests from such clients.

Figure 5:
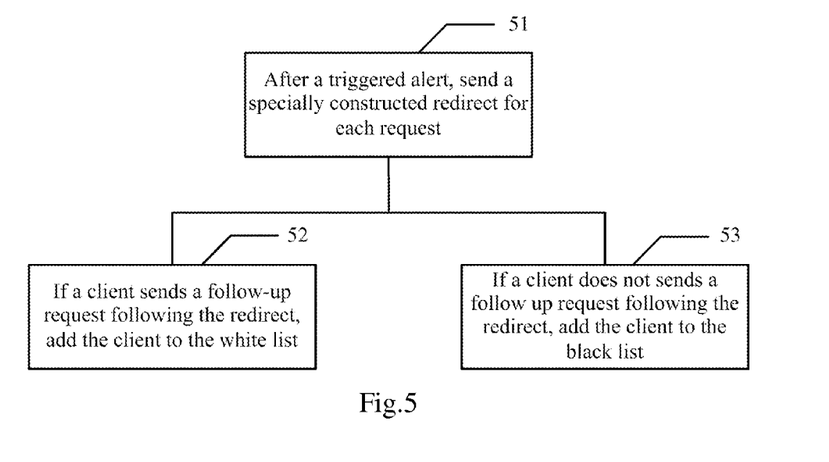
FIG. 5 is an attack mitigation procedure according to an embodiment of the invention.

4. If an activity alert is raised then the system starts issuing a CNAME DNS redirect to specially constructed domains (say, www.site.com could be CNAME'd to www1234.site.com). This will force real local resolvers with non-spoofed IP addresses to re-issue requests, eliminating attackers with spoofed IP addresses and attackers with only rudimentary DNS capabilities. FIG. 5 illustrates such an attack mitigation procedure including steps 51-53. In step 51: after a triggered alert, it sends a specially constructed redirect for each request; In step 52: if a client sends a follow-up request following the redirect, then it adds the client to the white list; In step 53: if a client does not sends a follow up request following the redirect, then it adds the client to the black list.

The following is the list of possible mitigation measures which can be used by the invention separately, altogether or in any combination of those for a Web server/proxy/cache:

1. If a global activity alert is raised (possible random domain attack), then it stops responding to non-essential requests (such as those using the HEAD method) and drops 4xx and 5xx responses.

2. If an activity alert is raised on one of the domains or URLs, the system starts monitoring activity per client's IP address and IP block, trying to detect clients that have increased their activity. It then drops requests from such clients, while continuing serving clients, which maintain a normal activity level.

3. If an activity alert is raised, then the system starts issuing specially constructed redirects (see FIG. 5). These redirects can be standard 302 HTTP redirects, or more sophisticated JavaScript-based redirects (see http://en.wikipedia.org/wiki/URL_redirection). This will force real users to re-issue requests, eliminating attackers with only rudimentary Web capabilities.

Embodiments of the invention provide a method for protecting against a detected attack within a content distribution system, which includes halting of processing of certain types of non-essential requests. Thus no information is sent to the client which initiated the said request. Particularly, for an authoritative DNS server, non-A queries are non-essential requests.

Embodiments of the invention provide a method for protecting against a detected attack within a content distribution system, which includes sending a special redirection response to the client, where the request was a DNS A-type request and the response is a CANME, or the request was an HTTP request and the response is an HTTP redirection. Where the redirection is a response with a status code beginning with 3, or the redirect is done using a refresh meta tag or HTTP refresh header, or the redirect is done using JavaScript by setting the window.location attribute.

When alerts get called off, mitigation methods are turned off as needed. The offending IP addresses can be logged and used as blacklists in this system or additional firewall and other networking protecting systems. The TA and BLTA averages and system thresholds can be reset after each attack or periodically for further enhancing the FRR and FAR metrics.

The foregoing descriptions of specific embodiments of the present invention are presented for the purposes of illustration and description. They are not intended to be exhaustive or to limit the invention to the precise forms disclosed. Many modifications and variations will be evident in view of the above teachings. The embodiments were chosen and described in order to best explain the principles of the invention and its practical applications, to thereby enable various embodiments with various modifications as are suited to the particular use contemplated. For example, the system can be used not only by content delivery networks, but also by any authoritative DNS servers, Web hosting systems, Web site operators, etc.

As another example, the embodiments described provide DDoS detection and mitigation closely integrated with DNS or Web serving software. In an alternative embodiment, the invention provides similar functionality for dedicated anti-DDoS network elements deployed as physical or virtual servers. It can be also integrated with global or local load balancers.

The present invention relates to communication over public Internet between end-user computers some of which can be generating unwanted requests to specialized servers within a content delivery network, where the resource utilization and available bandwidth are of concern.

According to embodiments of the invention, a method and apparatus for detecting a malicious application-level activity aimed at crippling a content distribution system are provided. The detection mechanism is based on comparing the estimates of current and background activity calculated by different recursive averaging formulas. These formulas are specially tuned for the specific applications and attack patterns, and are optimized for a minimal memory and processing overhead.

Different DNS servers (root servers or enterprise servers, etc.) experience different attacks on a regular basis. The invention teaches that the choice of the parameters of the detection formulas can be specific to each case, and that these parameters can be optimized based on previous observations.

It is disclosed a method for detecting and mitigating an unwanted activity aimed at one or more components of a content distribution system, such as a content delivery network. The detection algorithm is based on an automated way of comparing current load to a long-term average baseline. The mitigation measures are aimed at isolating the unwanted behavior and preventing the attacker from bringing down other components and/or services.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

Figure 6:
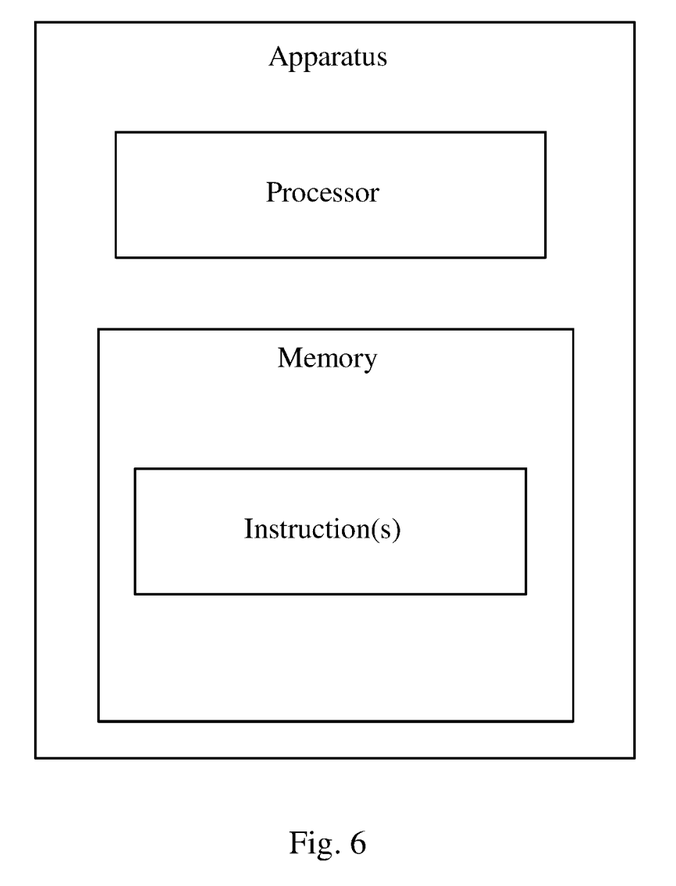
FIG. 6 is an apparatus including a processor and memory that stores instruction(s) executable by the processor according to another embodiment.

The invention has been described in a flow chart and/or a block diagram of the method, the apparatus (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram. For example, and as shown in FIG. 6, an apparatus may include a processor and memory that stores computer program instruction(s) executable by the processor.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for detecting an attack on a server, the method comprising executing on a processor the steps of:
    calculating interval time after a current request is received by the server, wherein the interval time is interval time between a time when a previous request is received by the server and a time when the current request is received by the server, or interval time between a time when a previous request, of a same type as a type of the current request, is received by the server and the time when the current request is received by the server, or interval time between a time when a previous response to the previous request, of the same type as the type of the current request, is sent by the server and a time when a response to the current request is sent by the server;
    calculating a baseline moving average of interval time according to the calculated interval time over a first period of time and calculating a trigger moving average of interval time according to the calculated interval time over a second period of time, wherein the first period of time is longer than the second period of time, and the baseline moving average of interval time reflects a change of interval time in a long history period, and the trigger moving average of interval time reflects a change of interval time in a recent period;
    when a ratio of the baseline moving average to the trigger moving average is larger than a first threshold, determining there is an attack on the server; and
    recalculating the trigger moving average, while the baseline moving average is not recalculated, when determining there is an attack on the server.

2. The method of claim 1, further comprising:
    when a ratio of the baseline moving average to a recalculated trigger moving average is smaller than a second threshold, determining there is no attack on the server.

3. The method of claim 1, wherein:
    the baseline moving average is a cumulative moving average; and/or
    the trigger moving average is an exponential weighted moving average.

4. The method of claim 1, further comprising:
    optimizing one or more of functional forms of the baseline moving average and the trigger moving average, and a value of the first threshold according to previous observations comprising interval time calculated previously.

5. The method of claim 2, further comprising:
    optimizing one or more of functional forms of the baseline moving average and the trigger moving average, and values of the first and second thresholds according to previous observations comprising interval time calculated previously.

6. The method of claim 1, wherein:
    different functional forms of the baseline moving average are adopted for different servers; and/or
    different functional forms of the trigger moving average are adopted for different servers.

7. The method of claim 4, wherein:
    the baseline moving average is a cumulative moving average; and/or
    the trigger moving average is an exponential weighted moving average.

8. The method of claim 2, wherein:
    the baseline moving average is a cumulative moving average; and/or
    the trigger moving average is an exponential weighted moving average.

9. A non-transitory computer readable medium encoded with computer executable instructions for performing the method of claim 1 when run on a computer controlled device.

10. An apparatus for detecting an attack on a server, the apparatus comprising:
    a processor; and
    memory storing executable instructions for detecting an attack on a server, which, when executed by the processor, cause the processor to:
    calculate interval time after a current request is received by the server, wherein the interval time is interval time between a time when a previous request is received by the server and a time when the current request is received by the server, or interval time between a time when a previous request, of a same type as a type of the current request, is received by the server and the time when the current request is received by the server, or interval time between a time when a previous response to the previous request, of the same type as the type of the current request is sent by the server and a time when a response to the current request is sent by the server;
    calculate a baseline moving average of interval time according to the calculated interval time over a first period of time;
    calculate a trigger moving average of interval time according to the interval time over a second period of time calculated by the processor, wherein the first period of time is longer than the second period of time, and the baseline moving average of interval time reflects a change of interval time in a long history period, and the trigger moving average of interval time reflects a change of interval time in a recent period;
    determine there is an attack on the server when a ratio of the baseline moving average to the trigger moving average is larger than a first threshold; and
    recalculate the trigger moving average and not to recalculate the baseline moving average when an attack on the server is determined.

11. The apparatus of claim 10, wherein:
    the executable instructions, when executed by the processor, cause the processor to determine there is no attack on the server when a ratio of the baseline moving average to a recalculated trigger moving average is smaller than a second threshold.

12. The apparatus of claim 10, wherein:
the baseline moving average is a cumulative moving average; and/or
the trigger moving average is an exponential weighted moving average.

13. The apparatus of claim 10, wherein:
the executable instructions, when executed by the processor, cause the processor to optimize one or more of functional forms of the baseline moving average and the trigger moving average, and a value of the first threshold according to previous observations comprising interval time calculated previously.

14. The apparatus of claim 11, wherein:
the executable instructions, when executed by the processor, cause the processor to optimize one or more of functional forms of the baseline moving average and the trigger moving average, and values of the first and second thresholds according to previous observations comprising interval time calculated previously.

15. The apparatus of claim 10, wherein:
different functional forms of the baseline moving average are adopted for different servers; and/or
different functional forms of the trigger moving average are adopted for different servers.

16. The apparatus of claim 10, wherein:
the apparatus is the server or another server for aggregating and processing information about requests collected from the server.

17. The apparatus of claim 13, wherein:
the baseline moving average is a cumulative moving average; and/or
the trigger moving average is an exponential weighted moving average.

18. The apparatus of claim 11, wherein:
the baseline moving average is a cumulative moving average; and/or
the trigger moving average is an exponential weighted moving average.

* * * * *